(12) United States Patent
Seo et al.

(10) Patent No.: US 7,173,680 B2
(45) Date of Patent: *Feb. 6, 2007

(54) MULTI-DOMAIN LIQUID CRYSTAL DISPLAY DEVICE

(75) Inventors: Seong Moh Seo, Kyungki-do (KR); Hyun Ho Shin, Kyungki-do (KR); Kyeong Jin Kim, Kyungki-do (KR); Yun Bok Lee, Kyungki-do (KR); Jeom Jae Kim, Seoul (KR)

(73) Assignee: L.G.Philips LCD Co., Ltd, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,693

(22) Filed: Jan. 19, 2006

(65) Prior Publication Data

US 2006/0114391 A1    Jun. 1, 2006

Related U.S. Application Data

(60) Division of application No. 10/890,990, filed on Jul. 15, 2004, now Pat. No. 7,009,672, which is a division of application No. 09/256,180, filed on Feb. 24, 1999, now Pat. No. 6,809,787, which is a continuation-in-part of application No. 09/250,262, filed on Feb. 16, 1999, now Pat. No. 6,335,776.

(30) Foreign Application Priority Data

Dec. 11, 1998 (KR) .................................. 98-54557
Feb. 19, 1999 (KR) .................................. 99-05587

(51) Int. Cl.
G02F 1/1337 (2006.01)
G02F 1/1343 (2006.01)

(52) U.S. Cl. ...................... 349/129; 349/143

(58) Field of Classification Search ................. 349/129, 349/38, 46, 143
See application file for complete search history.

(56) References Cited

U.S. PATENT DOCUMENTS 4,448,492 A * 5/1984 Huffman ................... 350/346

(Continued)

FOREIGN PATENT DOCUMENTS

DE        44 07 043 A1    9/1994

(Continued)

OTHER PUBLICATIONS

A. Lien, R.A. John, Two-Domain TN-LCDs Fabricated by Parallel Fringe Field Method, SID Digest, 1993, pp. 269-272.

(Continued)

*Primary Examiner*—Huyen Ngo
*Assistant Examiner*—Mike Qi
(74) *Attorney, Agent, or Firm*—McKenna Long & Aldridge, LLP

(57) ABSTRACT

A multi-domain liquid crystal display device includes first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A pixel electrode is electrically charged through the data bus line in the pixel region. A common-auxiliary electrode surrounds the pixel electrode on a same layer whereon the gate bus line is formed.

6 Claims, 21 Drawing Sheets

U.S. PATENT DOCUMENTS

| | | | |
|---|---|---|---|
| 4,581,608 A | | 4/1986 | Aftergut et al. |
| 4,728,175 A | | 3/1988 | Baron |
| 4,937,566 A | | 6/1990 | Clerc |
| 4,978,203 A | | 12/1990 | Yamazaki et al. |
| 5,249,070 A | * | 9/1993 | Takano .................. 359/54 |
| 5,528,396 A | * | 6/1996 | Somery et al. ............ 359/59 |
| 5,574,582 A | | 11/1996 | Takeda et al. |
| 5,623,354 A | | 4/1997 | Lien et al. |
| 5,668,650 A | | 9/1997 | Mori et al. |
| 5,694,185 A | * | 12/1997 | Oh ....................... 349/46 |
| 5,721,601 A | * | 2/1998 | Yamaji et al. ............ 349/138 |
| 5,737,051 A | | 4/1998 | Kondo et al. |
| 5,777,701 A | | 7/1998 | Zhang ................... 349/44 |
| 5,907,376 A | * | 5/1999 | Shimada et al. ........... 349/42 |
| 6,100,953 A | * | 8/2000 | Kim et al. ............... 349/129 |
| 6,184,961 B1 | | 2/2001 | Ham |
| 6,335,776 B1 | | 1/2002 | Kim et al. |
| 6,462,798 B1 | * | 10/2002 | Kim et al. ............... 349/129 |
| 6,525,794 B1 | * | 2/2003 | Kim et al. ............... 349/129 |
| 6,781,657 B1 | * | 8/2004 | Kim et al. ............... 349/129 |

FOREIGN PATENT DOCUMENTS

| | | |
|---|---|---|
| EP | 0 752 611 | 1/1997 |
| EP | 0 805 373 A2 | 11/1997 |
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 1/1999 |
| JP | 5-297412 * | 11/1993 |
| JP | 09-197420 | 7/1997 |
| JP | 09-230387 | 9/1997 |
| WO | 961 0774 | 4/1996 |
| WO | WO 961 0774 | 4/1996 |

OTHER PUBLICATIONS

A. Lien, R.A. John, TFT-Addressed Two-Domain TN VGA Displays Fabricated Using the Parallel Fringe Field Method, SID Digest, 1994, pp. 594-597.

N. Koma, Y. Baba, K. Matsuoka, No-Rub Multi-Domain TFT-LCD Using Surrounding-Electrode Method, SID Digest, 1995, pp. 869-872.

H. Mural, M. Suzuki, S. Kaneko, Novel High Contrast Random and Controlled 4-Domain CTN-LCDs with Wide Viewing Angle, Euro Display '96, pp. 159-161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super-High Image Quality, IDW '97, pp. 159-162.

N. Koma, R. Nishikawa, Development of a High-Quality TFT-LCD for Projection Displays, SID Digest, 1997, pp. 461-464.

K. Ohmuro, S. Kataoka, T. Sasaki, Y. Koike, Development of Super-High Image Quality Vertical Alignment Mode LCD, SID Digest, 1997, pp. 845-848.

Combined Search and Examination Report Under Sections 17 and 18(3).

A. Lien, R.A. John, Two-Domain TN-LCDs Fabricated by Parallel Fringe Field Method, SID Digest, 1993, pp. 269-272.

A. Lien, R.A. John, TFT-Addressed Two-Domain TN VGA Displays Fabricated Using the Parallel Fringe Field Method, SID Digest, 1994, pp. 594-597.

N. Koma, Y. Baba, K. Matsuoka, No-Rub Multi-Domain TFT-LCD Using Surrounding-Electrode Method, SID Digest, 1995, pp. 869-872.

H. Murai, M. Suzuki, S. Kaneko, Novel High Contrast Random and Controlled 4-Domain CTN-LCDs with Wide Viewing Angle, Euro Display '96, pp. 159-161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super-High Image Quality, IDW '97, pp. 159-162.

N. Koma, R. Nishikawa, Development of a High-Quality TFT-LCD for Projection Displays, SID Digest, 1997, pp. 461-464.

K. Ohmuro, S. Kataoka, T. Sasaki, Y. Koike, Development of Super-High Image Quality Vertical Alignment Mode LCD, SID Digest, 1997, pp. 845-848.

* cited by examiner

MULTI-DOMAIN LIQUID CRYSTAL DISPLAY DEVICE

This application is a Divisional application Ser. No. 10/890,990, filed on Jul. 15, 2004 now U.S. Pat. No. 7,009,672, now allowed, which is a divisional of application Ser. No. 09/256,180, filed Feb. 24, 1999, now U.S. Pat. No. 6,809,787, which is a continuation-in-part of prior application Ser. No. 09/250,262, filed on Feb. 16, 1999, now U.S. Pat. No. 6,335,776 all of which are hereby incorporated by reference as if fully set forth herein.

BACKGROUND OF THE INVENTION

1. Field of the Invention

The present invention relates to a liquid crystal display device (LCD), and more particularly, to a liquid crystal display device having a side or auxiliary electrode.

2. Description of the Related Art

Recently, an LCD has been proposed where the liquid crystal is not aligned and the liquid crystal is driven by common-auxiliary electrodes insulated from pixel electrodes. FIG. 1 is sectional view of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT) applies image signal delivered from the data bus line to a pixel electrode 13 on a passivation layer 37. The TFT is formed on each pixel region and comprises a gate electrode, a gate insulator, a semiconductor layer, a source electrode, and a drain electrode, etc. Side electrode 15 is formed surrounding the pixel electrode 13 on the gate insulator, thereon passivation layer 37 is formed over the whole first substrate, and a part of pixel electrode 13 overlaps side electrode 15.

Alternatively, pixel electrode 13 is formed on the gate insulator, and passivation layer 37 is formed over the whole first substrate.

On second substrate, a common electrode 17 is formed and together with pixel electrode 13 applies electric field to a liquid crystal layer. Side electrode 21 and open area (slit) 27 distort the electric field applied to the liquid crystal layer. Then in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. Then, when voltage over a threshold voltage, $V_{th}$, is applied, the time needed to stabilize the liquid crystal directors increases. In particular, the response time can be over 100 msec. At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having high response time characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a liquid crystal layer between said first and second substrates; a plurality of gate bus lines arranged in a first direction on said first substrate and a plurality of data bus lines arranged in a second direction on said first substrate to define a pixel region; a pixel electrode electrically charged through said data bus line in said pixel region; a common-auxiliary electrode surrounding said pixel electrode on a same layer whereon said gate bus line is formed; a gate insulator over said whole first substrate; a passivation layer on said gate insulator over said whole first substrate; a light shielding layer on said second substrate; a color filter layer on said light shielding layer; a common electrode on said color filter layer; and an alignment layer on at least one substrate between said first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE PREFERRED EMBODIMENTS

Hereinafter, the multi-domain liquid crystal display device of the present invention is explained in detail by accompanying the drawings.

Figure 1:
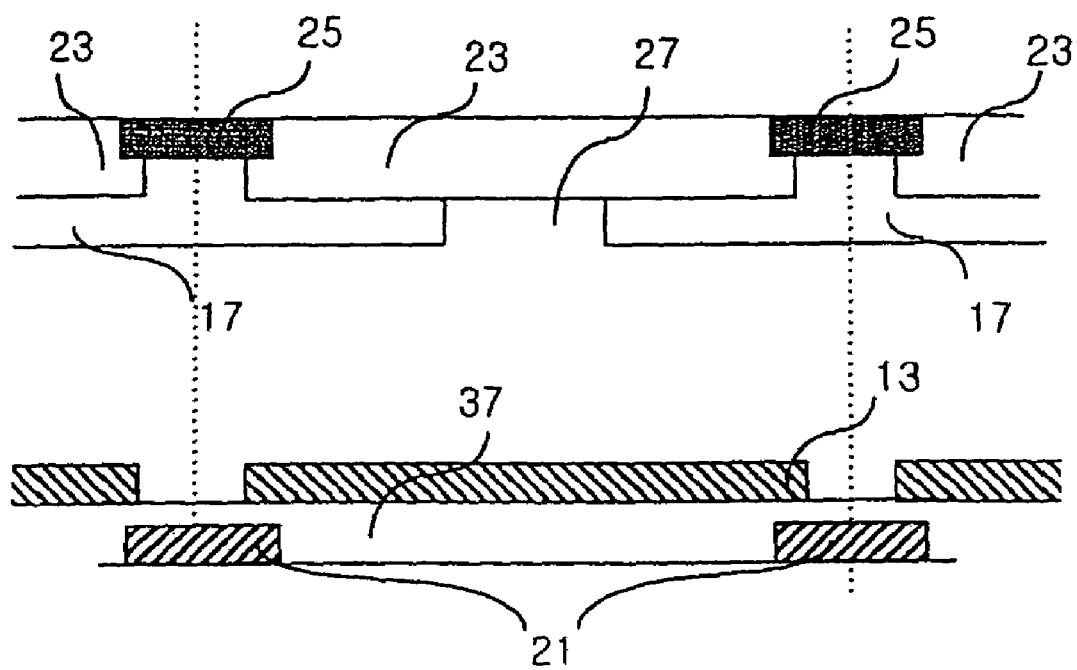
FIG. 1 is a sectional view of the liquid crystal display device in the related art.
Figure 2A:
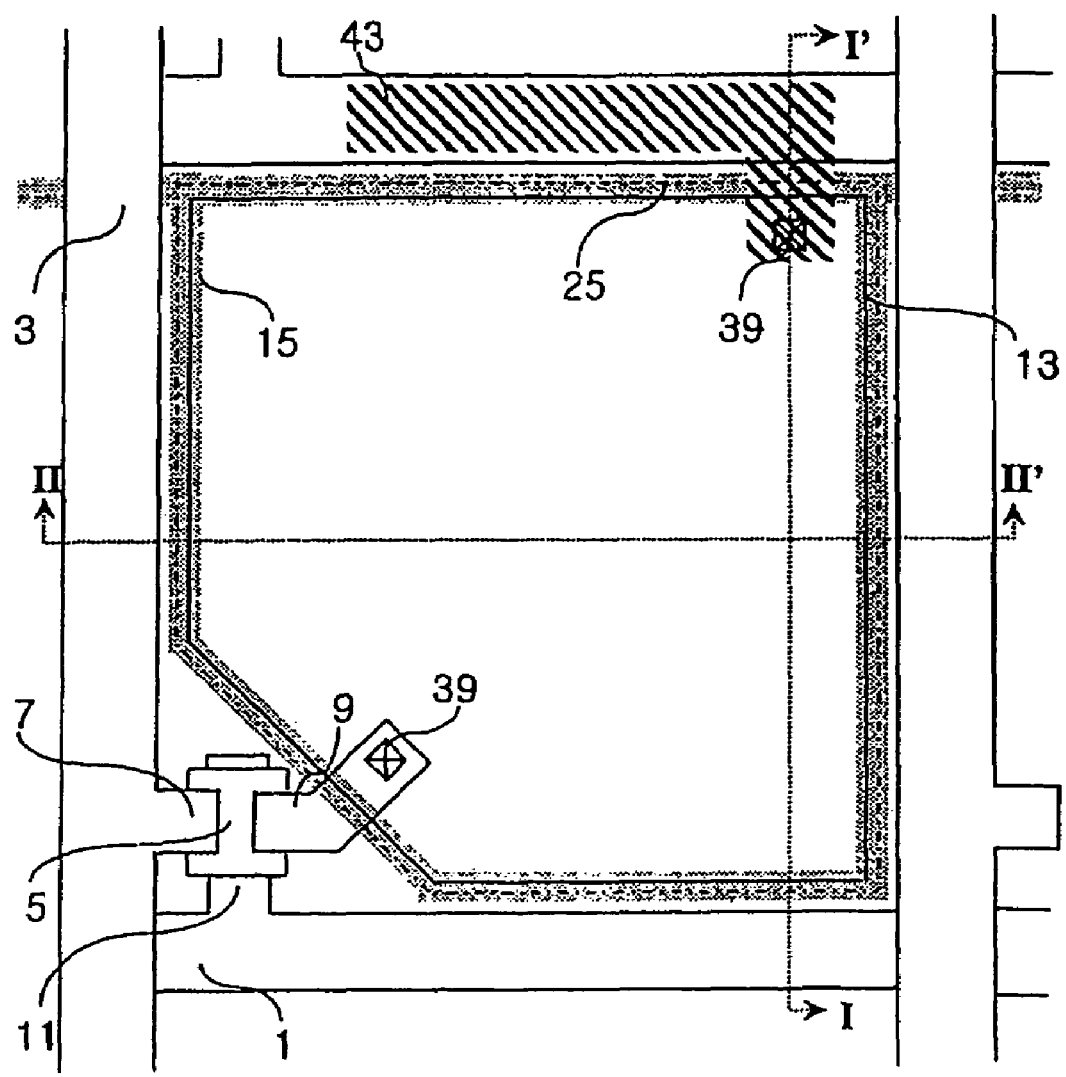
FIGS. 2A, 2B, and 2C, 2D, 2E, 2F, 2G are plan and sectional views of the multi-domain liquid crystal display devices according to the first embodiment of the present invention.
Figure 2B:
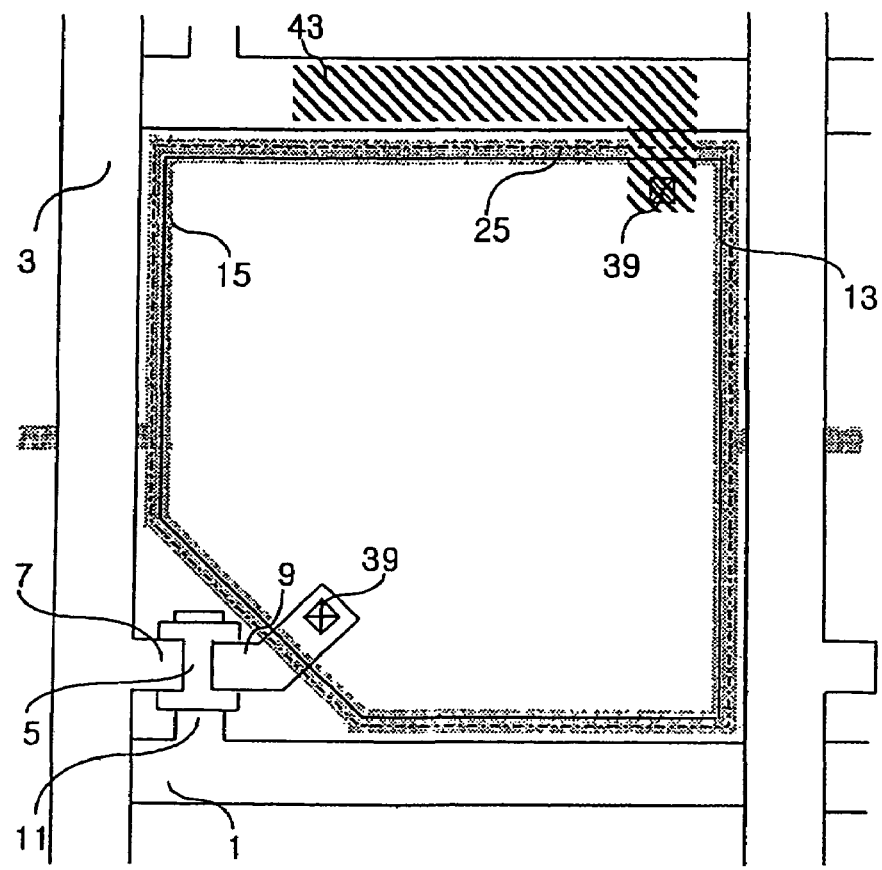
Figure 2C:
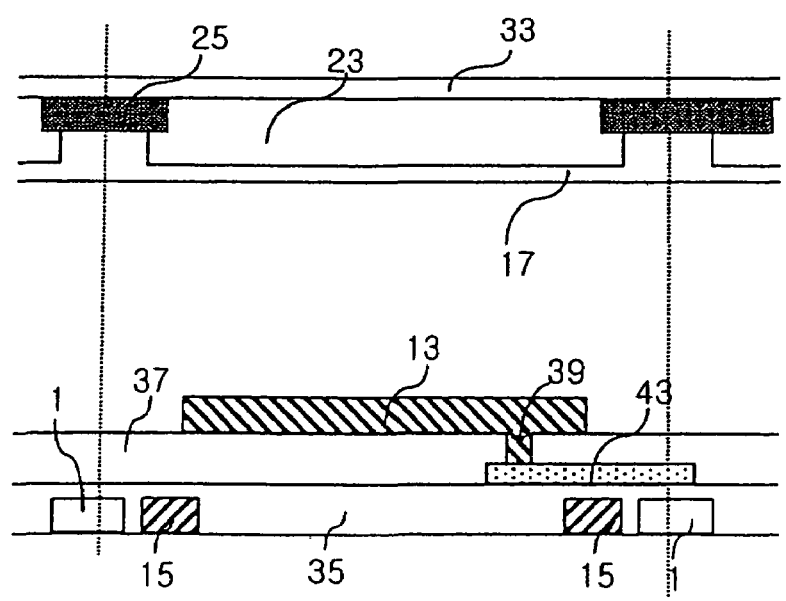

FIGS. 2A and 2B are plan views of the multi-domain liquid crystal display devices according to the first embodiment of the present invention, and FIGS. 2C and 2D, 2E, 2F, 2G are sectional views taken along the lines I–I' and II–II' in FIG. 2A.

As shown in the figures, the present invention comprises first and second substrates, a plurality of gate bus lines 1 arranged in a first direction on a first substrate and a plurality of data bus lines 3 arranged in a second direction on the first substrate, a common-auxiliary electrode 15, a TFT, a passivation layer 37, and a pixel electrode 13.

On a second substrate, a light shielding layer 25 is formed to shield the light leaked from gate and data bus lines 1, 3, and the TFT, a color filter layer 23 is formed on the light shielding layer, a common electrode 17 is formed on the color filter layer, and a liquid crystal layer is formed between the first and second substrates.

Data bus lines 3 and gate bus lines 1 divide the first substrate into a plurality of pixel regions. The common-auxiliary electrode distorts electric field on a same layer whereon the gate bus line is formed. The TFT is formed on each pixel region and comprises a gate electrode 11, a gate insulator 35, a semiconductor layer 5, an ohmic contact layer (not shown in the figure), and source/drain electrodes 7, 9. Passivation layer 37 is formed on the whole first substrate 31. Pixel electrode 13 is coupled to drain electrode 9.

To manufacture the multi-domain LCD of the present invention, in each pixel region on the first substrate, a TFT is formed comprising gate electrode 11, gate insulator 35, semiconductor layer 5, ohmic contact layer (not shown in the figure) and source/drain electrodes 7, 9. At this time, a plurality of gate bus lines 1 and a plurality of data bus lines 3 are formed to divide the first substrate 31 into a plurality of pixel regions.

Gate electrode 11 and gate bus line 1 are formed by sputtering and patterning a metal such as Al, Mo, Cr, Ta, Al alloy, etc. At this time, common-auxiliary electrode 15 is formed surrounding the pixel region. The gate insulator 35 is formed by depositing $SiN_x$ or $SiO_x$ using PECVD thereon. Semiconductor layer 5 and the ohmic contact layer are formed by depositing with PECVD (Plasma Enhanced Chemical Vapor Deposition) and patterning amorphous silicon (a-Si) and doped amorphous silicon ($n^+$ a-Si), respectively. Also, gate insulator 35, amorphous silicon (a-Si), and doped amorphous silicon ($n^+$ a-Si) are formed by PECVD and patterned. Data bus line 3 and source/drain electrodes 7, 9 are formed by sputtering and patterning a metal such as Al, Mo, Cr, Ta, Al alloy, etc.

A storage electrode 43 is formed to overlap gate bus line 1 and/or common-auxiliary electrode 15 at the same time, the storage electrode 43 makes a storage capacitor with gate bus line 1 and/or common-auxiliary electrode 15.

Subsequently, passivation layer 37 is formed with BCB (BenzoCycloButene), acrylic resin, polyimide based material, $SiN_x$ or $SiO_x$ on the whole first substrate. Pixel electrode 13 is formed by sputtering and patterning a metal such as ITO (indium tin oxide). A contact hole 39 is formed to connect the pixel electrode to the drain and storage electrodes by opening and patterning a part of the passivation layer on drain electrode 9.

When common-auxiliary electrode 15 and gate bus line 1 are formed with the same material, the common-auxiliary and gate electrodes are simultaneously formed with one mask and connected electrically to common electrode 17, or it is possible to form them with different materials or double layer with additional masks.

On the second substrate 33, a light shielding layer 25 is formed to shield any light leakage from gate and data bus lines 1, 3, the TFT, and common-auxiliary electrode 15. A color filter layer 23 is formed R, G, B (red, green, blue) elements to alternate on the light shielding layer. A common electrode 17 is formed with ITO on the color filter layer, and a liquid crystal layer is formed by injecting liquid crystal between the first and second substrates.

To apply voltage ($V_{com}$) to common-auxiliary electrode 15, Ag-dotting part is formed in each corner of driving area on first substrate 31, electric field is applied with second substrate 33, and the liquid crystal molecules are driven by the potential different. A voltage ($V_{com}$) is applied to common-auxiliary electrode 15 by connecting the Ag-dotting part to the common-auxiliary electrode, which is accomplished simultaneously by forming the common-auxiliary electrode.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, polarizer is formed on at least one substrate. At this time, the compensation film and polarizer are preferably composed as one.

In the multi-domain liquid crystal display device in the FIG. 2, pixel electrode 13 overlaps common-auxiliary electrode 15, light shielding layer 25 overlaps the common-auxiliary electrode, and then the aperture ratio is improved. Storage electrode 43 forms a storage capacitor $C_{ST}$ by overlapping gate bus line 1. Although not shown in the figures, the storage electrode 43 may overlap the common-auxiliary electrode 15.

Figure 2D:
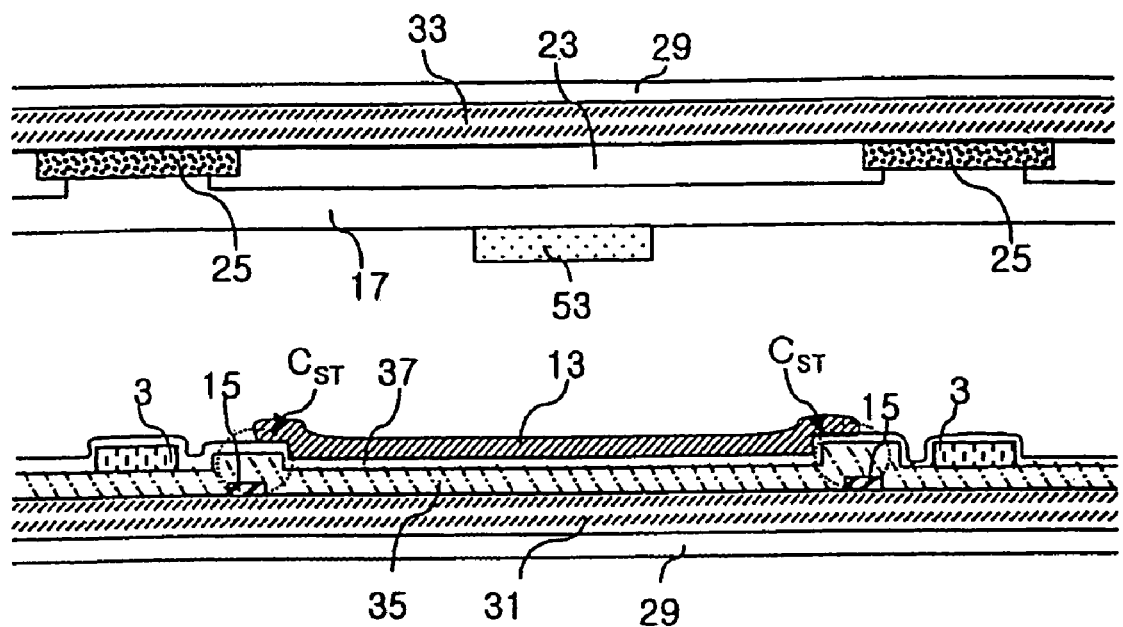
Figure 2E:
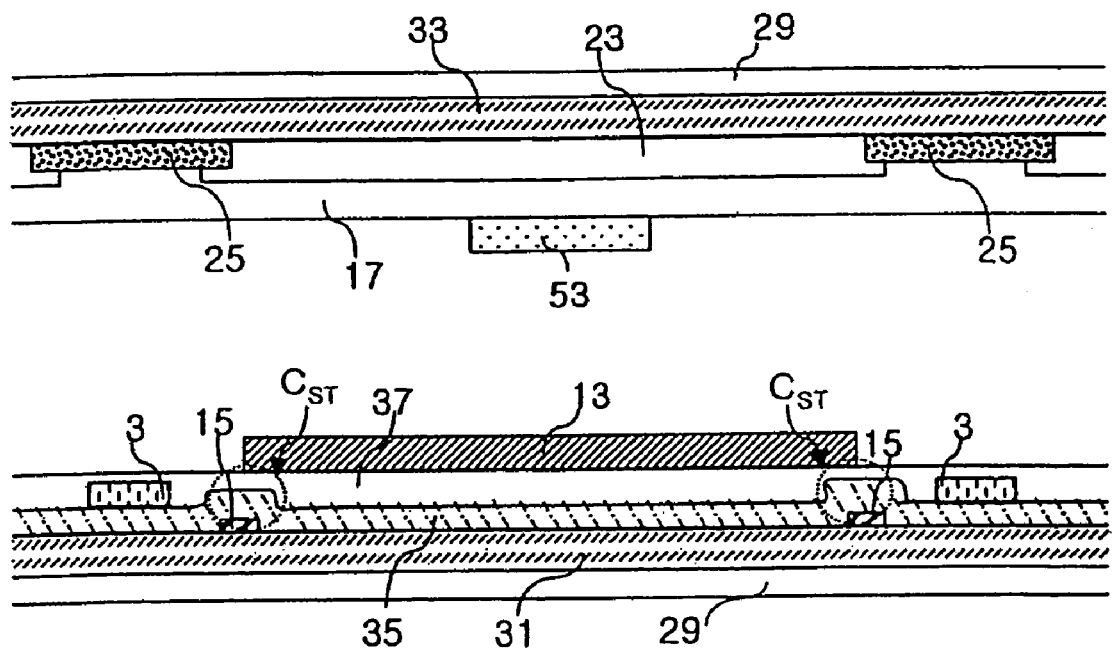
Figure 2F:
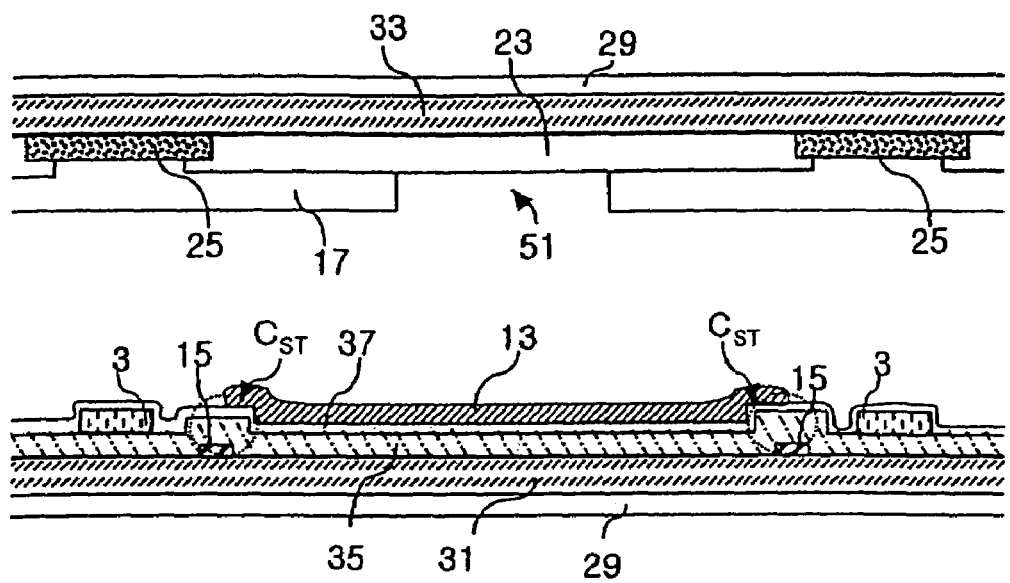
Figure 2G:
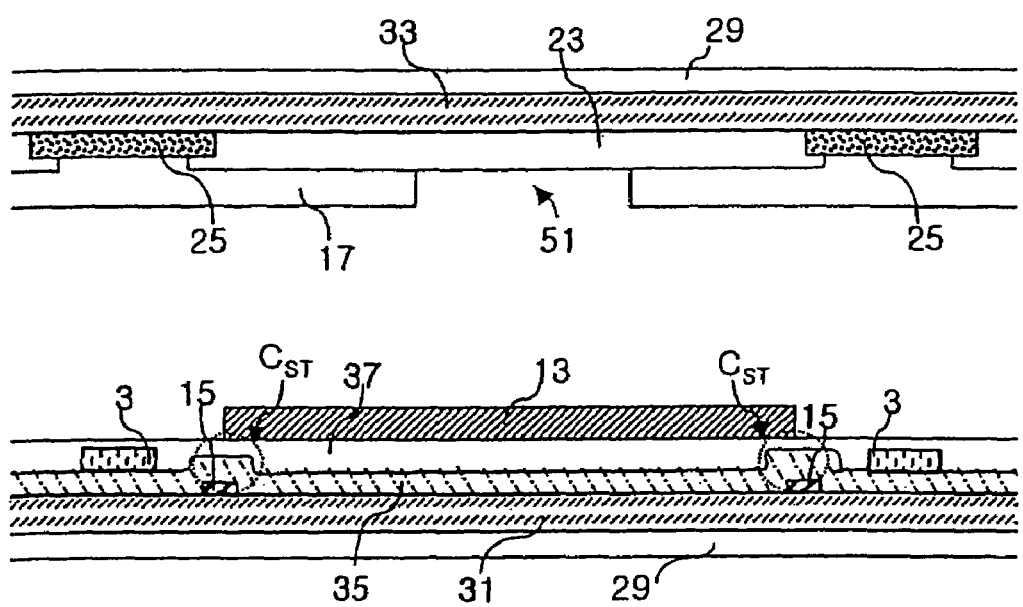

Moreover, the LCD in FIG. 2B has lower short generation in the common-auxiliary electrode and gate bus line than that of FIG. 2A. FIG. 2D, 2F show that passivation layer 37 includes $SiN_x$ or $SiO_x$ and FIGS. 2E, 2G show that passivation layer 37 includes BCB or acrylic resin in the LCD. Also, FIGS. 2D, 2E show that dielectric frame 53 is formed on the common electrode 17, and FIGS. 2F, 2G show that electric field inducing window 51 is formed in the common electrode 17.

Figure 3A:
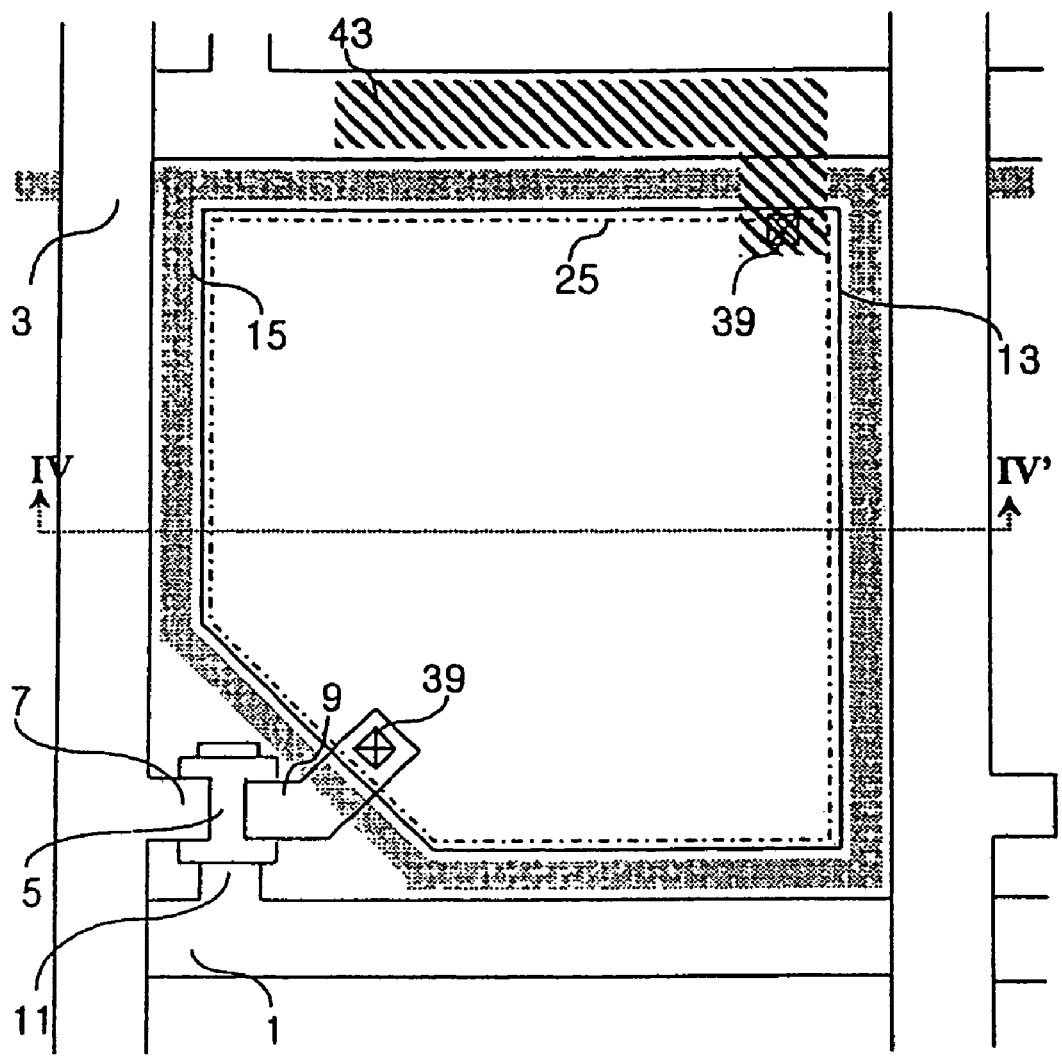
FIGS. 3A, 3B, and 3C, 3D, 3E, 3F, 3G, 3H are plan and sectional views of the multi-domain liquid crystal display devices according to the second embodiment of the present invention.
Figure 3B:
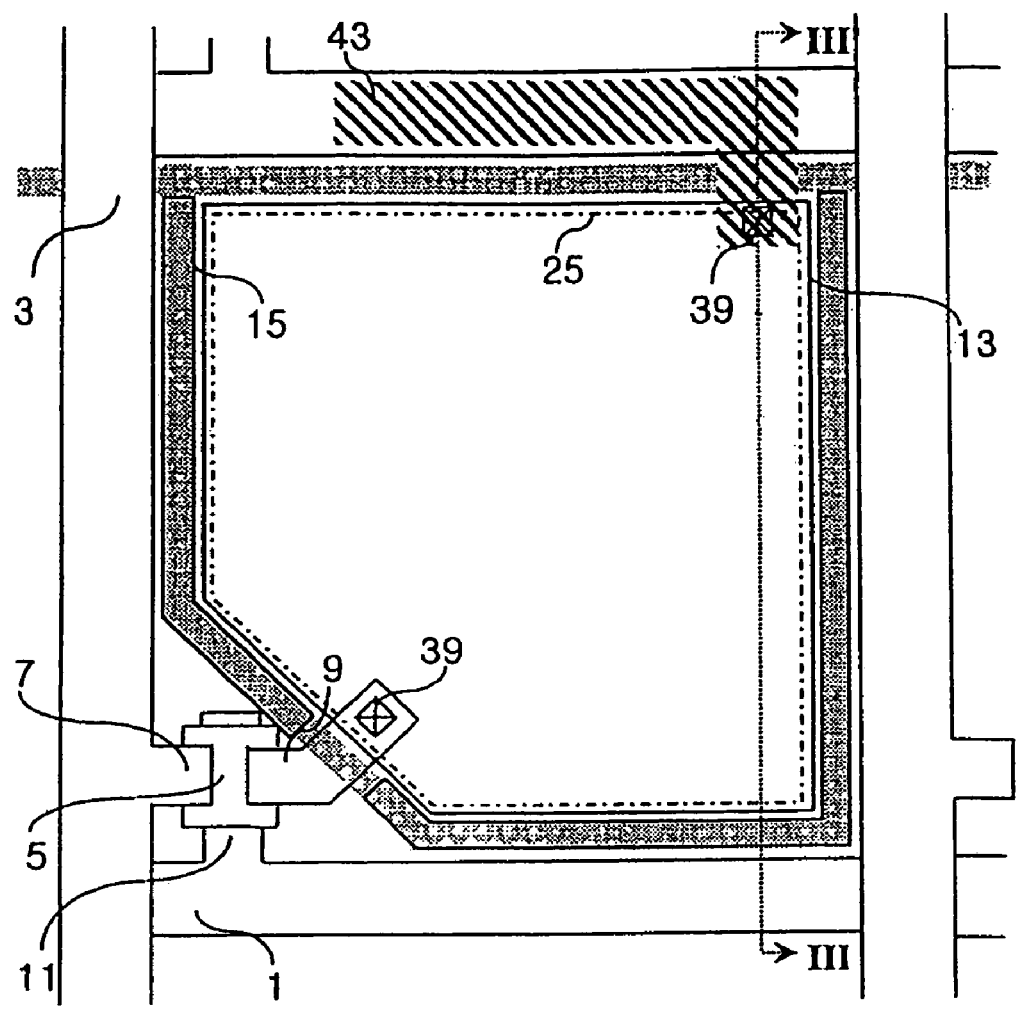
Figure 3C:
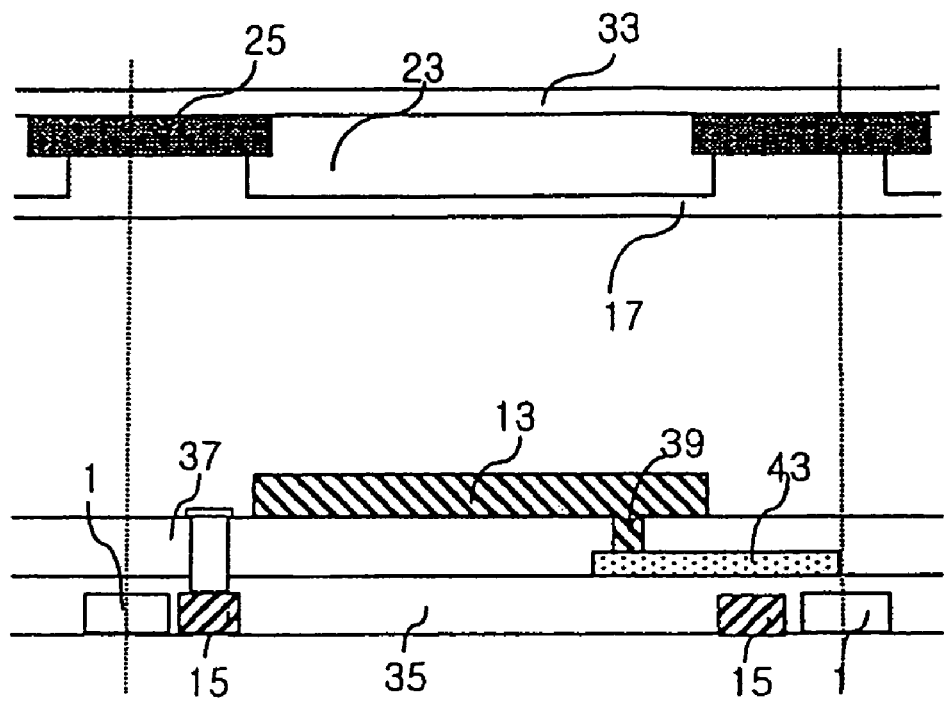
Figure 3D:
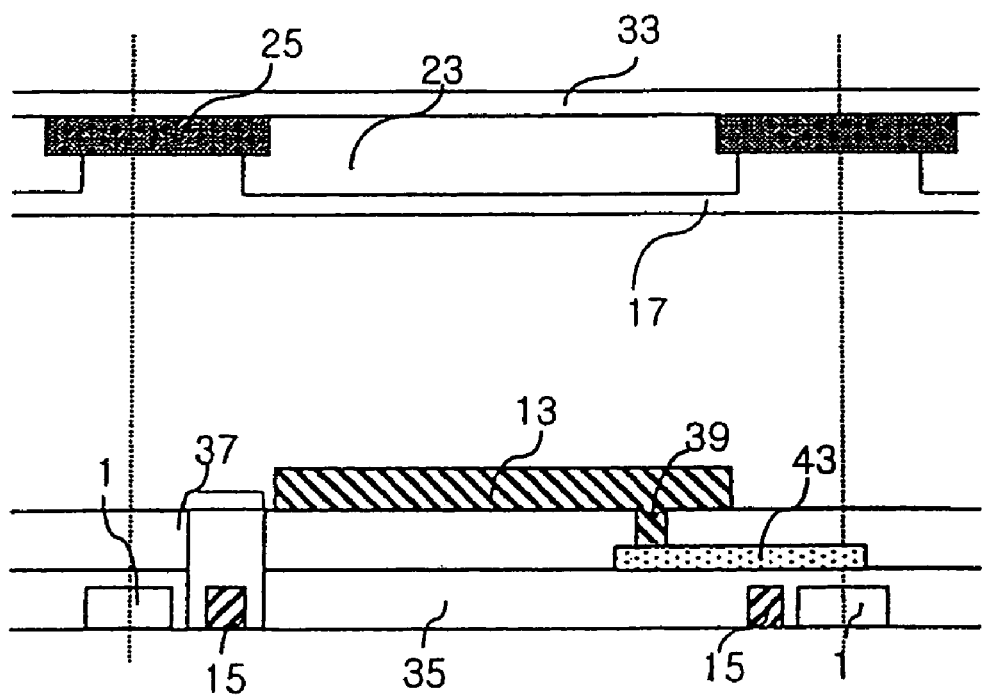

FIGS. 3A and 3B are plan views of the multi-domain liquid crystal display devices according to the second embodiment of the present invention, and FIGS. 3C and 3D are sectional views taken along the lines III–III' in FIG. 3B, FIGS. 3E, 3F, 3G, 3H are sectional views taken along the lines IV–IV' in FIG. 3A.

Pixel electrode 13 does not overlap common-auxiliary electrode 15, and the light shielding layer 25 overlaps the pixel electrode 13. At this time, the gate insulator 35 and the passivation layer 37 on the common-auxiliary electrode 15 are removed, which intensifies the electric field of common-auxiliary electrode 15 that is applied to the pixel electrode 13 (refer to FIG. 3B).

The FIG. 3C shows a portion of the gate insulator 35 and passivation layer 37 that are removed to expose a part of the common-auxiliary electrode 15, and the FIG. 3D shows that three sides of the common-auxiliary electrode 15 are exposed.

Storage electrode 43 forms storage capacitor by overlapping gate bus line 1. Although not shown in the figures, the storage electrode 43 may overlap the common-auxiliary electrode 15.

Figure 3E:
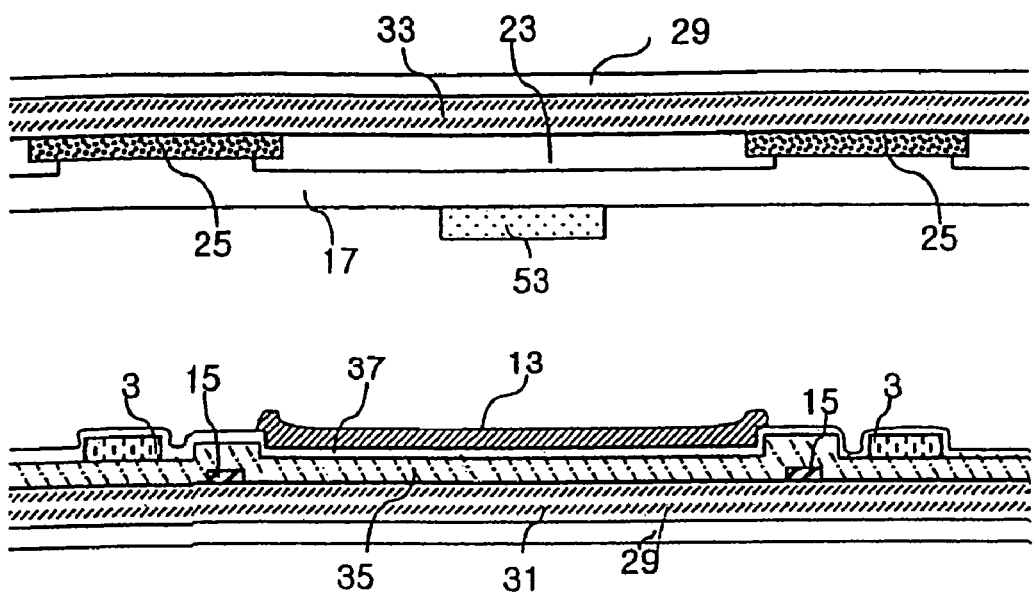
Figure 3F:
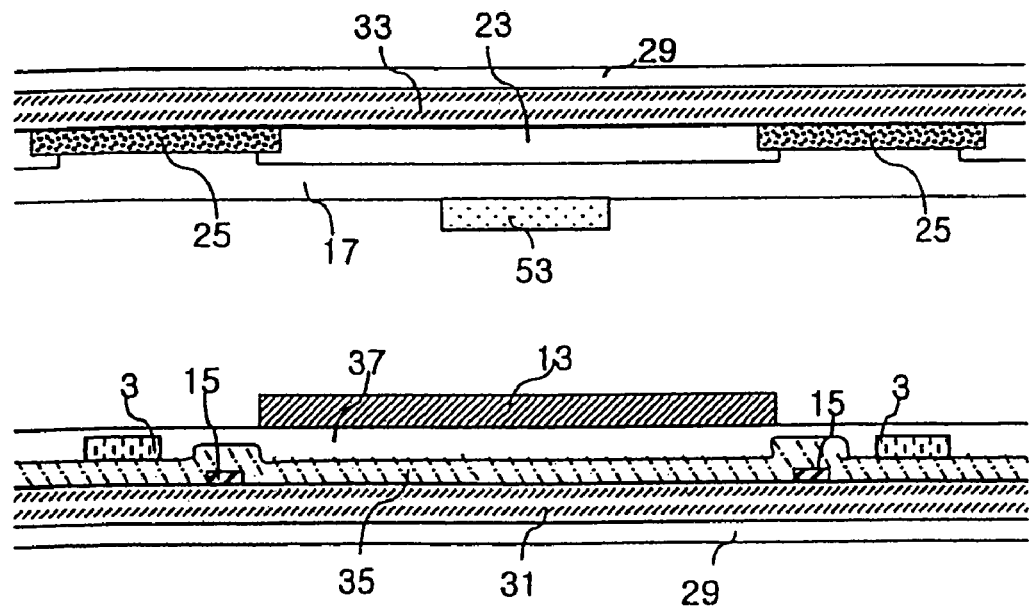
Figure 3G:
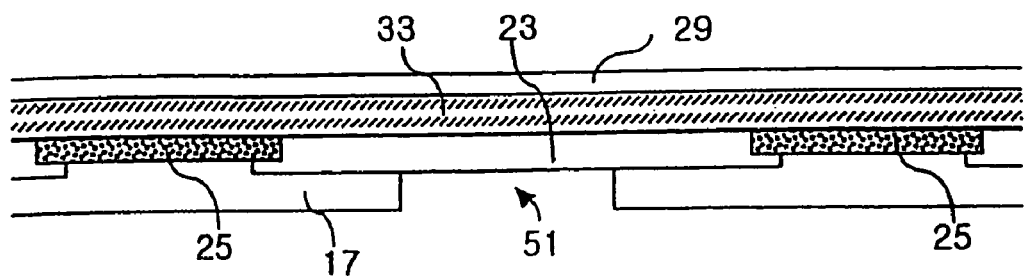
Figure 3G:
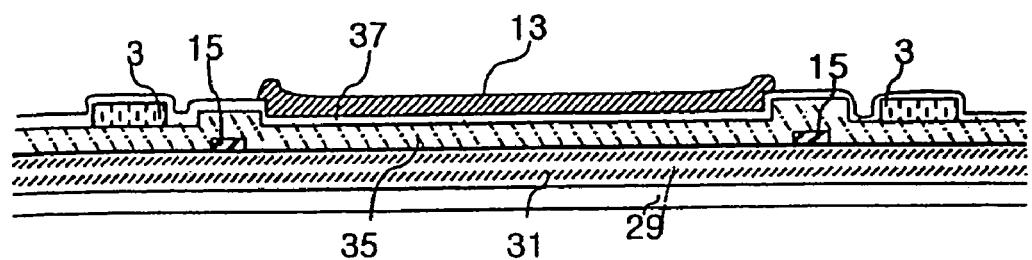
Figure 3H:
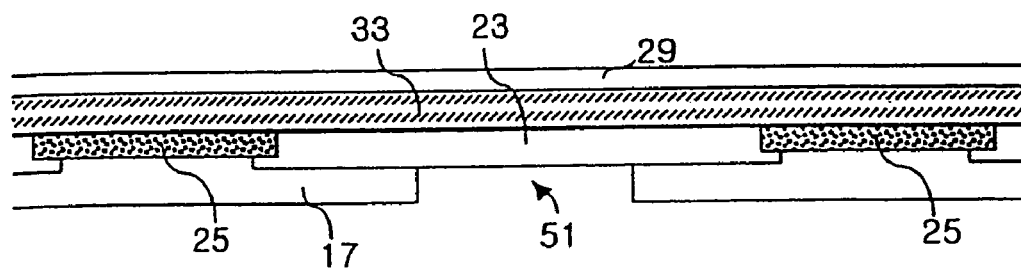
Figure 3H:
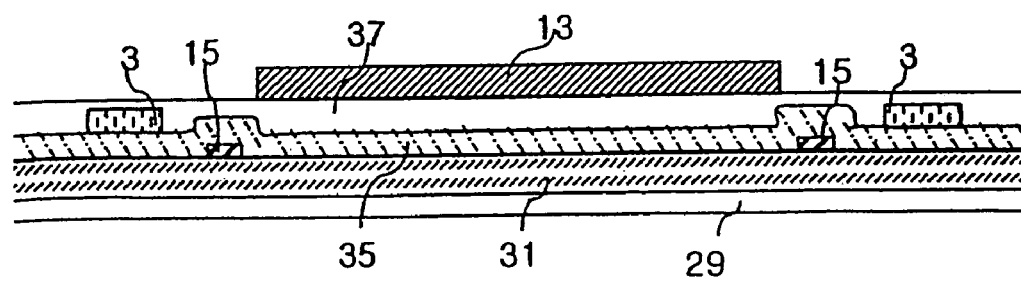

FIGS. 3E, 3G show that passivation layer 37 includes $SiN_x$ or $SiO_x$ and FIGS. 3F, 3H show that passivation layer 37 includes BCB or acrylic resin in the LCD. Also, FIGS. 3E, 3F show that dielectric frame 53 is formed on the common electrode 17, and FIGS. 3G, 3H show that electric field inducing window 51 is formed in the common electrode 17.

Figure 4A:
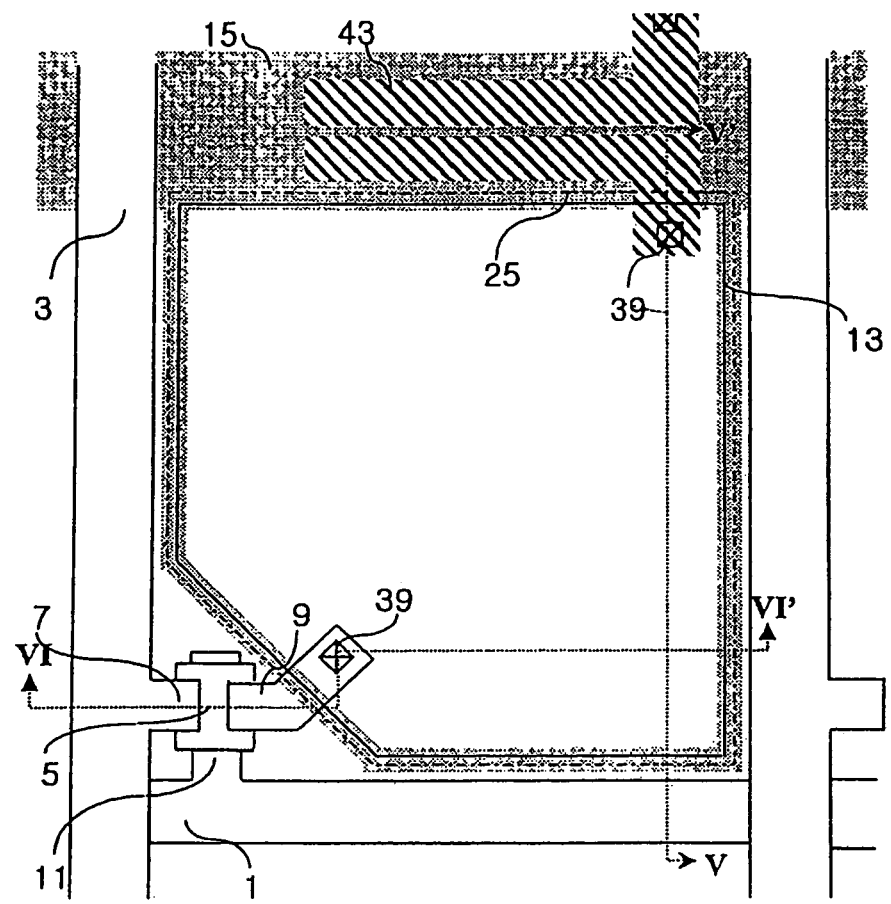
FIGS. 4A and 4B, 4C, 4D, 4E, 4F are plan and sectional views of the multi-domain liquid crystal display devices according to the third embodiment of the present invention.
Figure 4B:
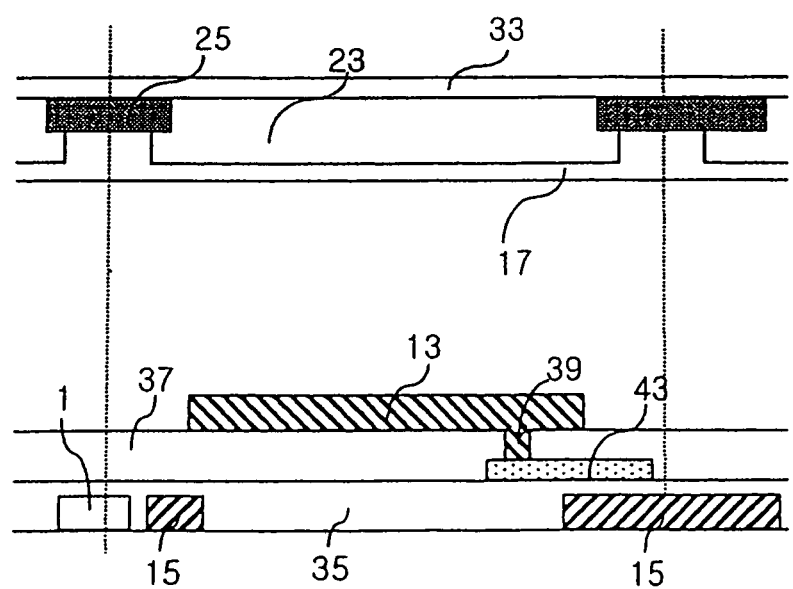

FIG. 4A is a plan view of the multi-domain liquid crystal display device according to the third embodiment of the present invention, and FIGS. 4B and 4C, 4D, 4E, 4F are sectional views taken along the lines V–V' and VI–VI' in FIG. 4A.

In the multi-domain LCD of the present invention, a part of upper-down pixels is formed on common-auxiliary electrode 15 that include a storage electrode 43. The aperture ratio is largely improved as compared to the LCD in FIG. 2.

Figure 4C:
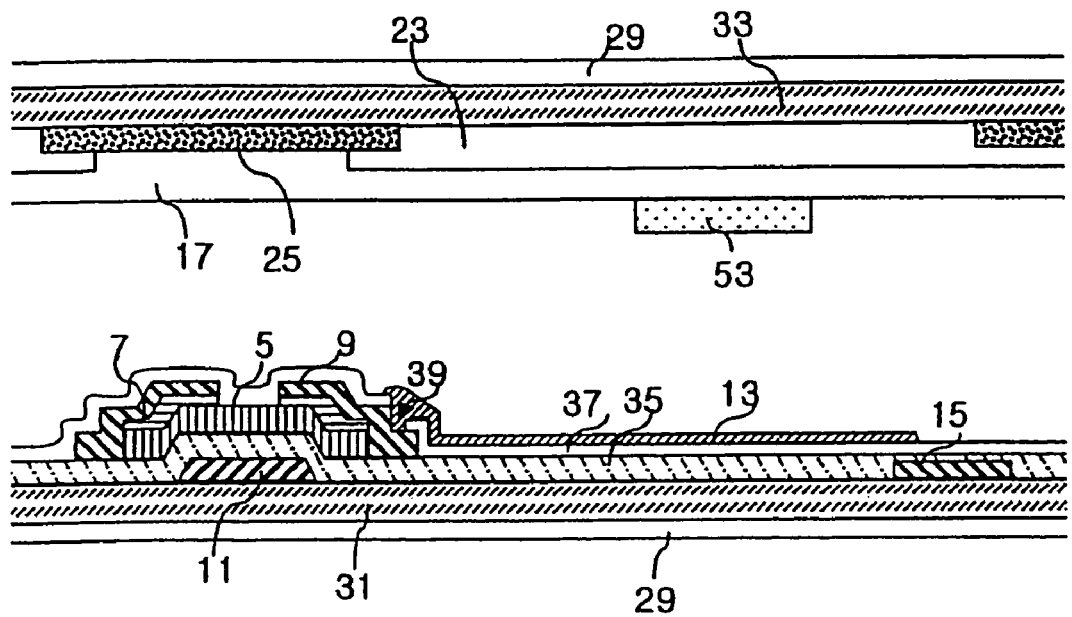
Figure 4D:
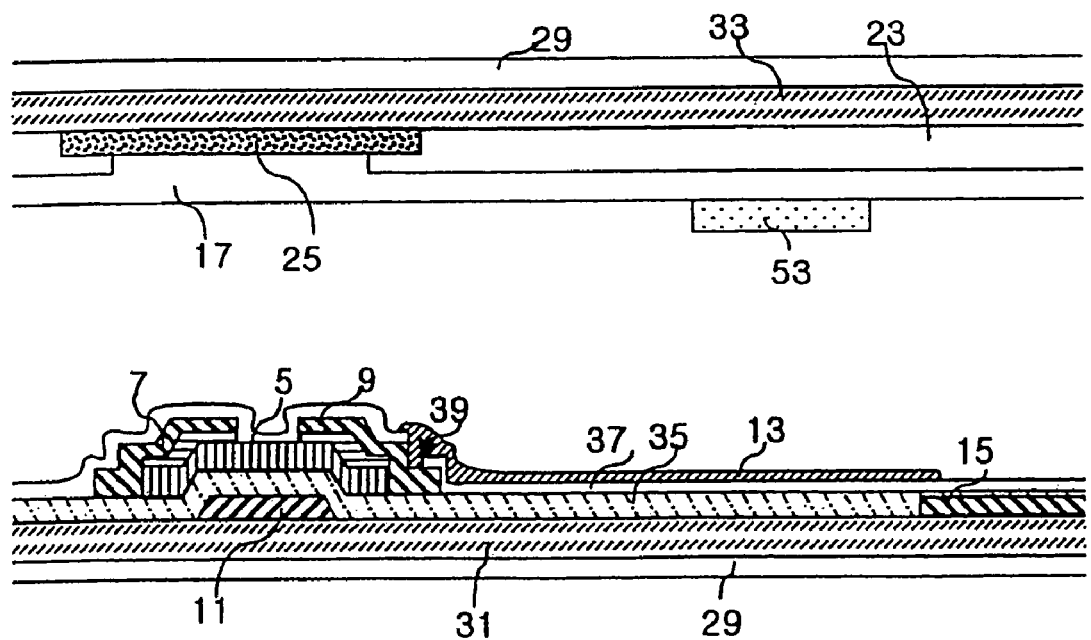
Figure 4E:
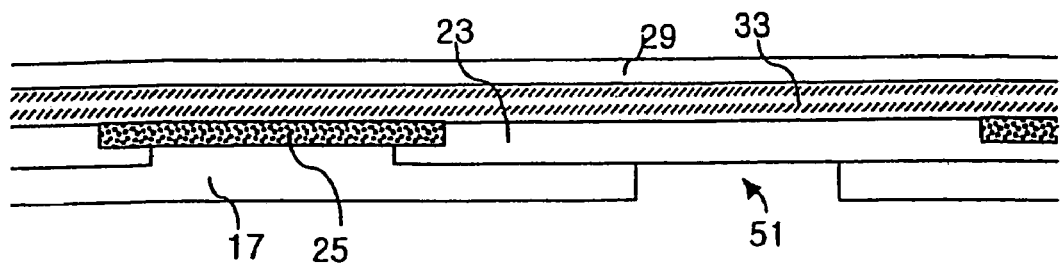
Figure 4E:
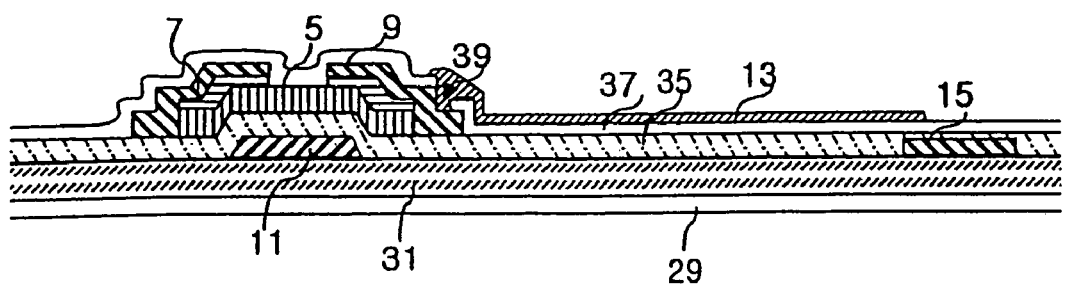
Figure 4F:
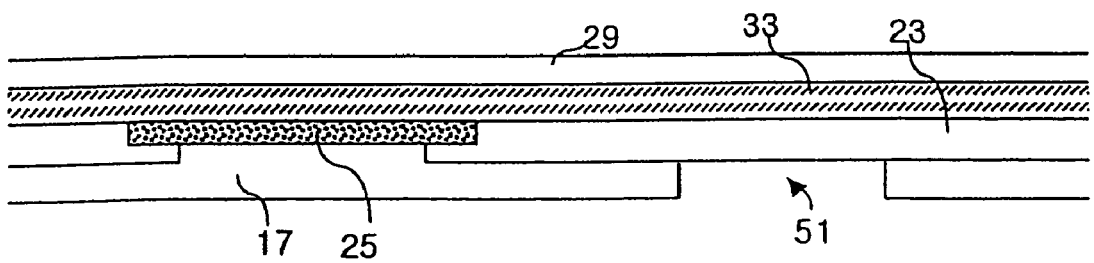
Figure 4F:
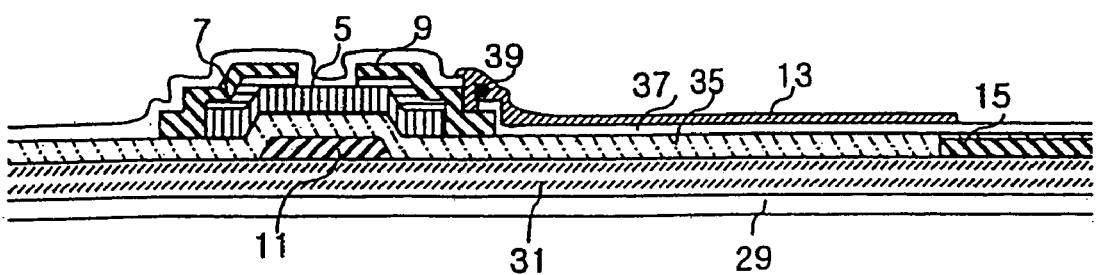

Moreover, the pixel electrode 13 overlaps common-auxiliary electrode 15, the light shielding layer 25 overlaps the common-auxiliary electrode 15, and the storage electrode 43 forms a storage capacitor with common-auxiliary electrode 15. FIGS. 4C, 4D show that dielectric frame 53 is formed on the common electrode 17, and FIGS. 4E, 4F show that electric field inducing window 51 is formed in the common electrode 17. Also, FIGS. 4D, 4F show that the light shield layer 25 is formed only on the thin film transistor.

Figure 5A:
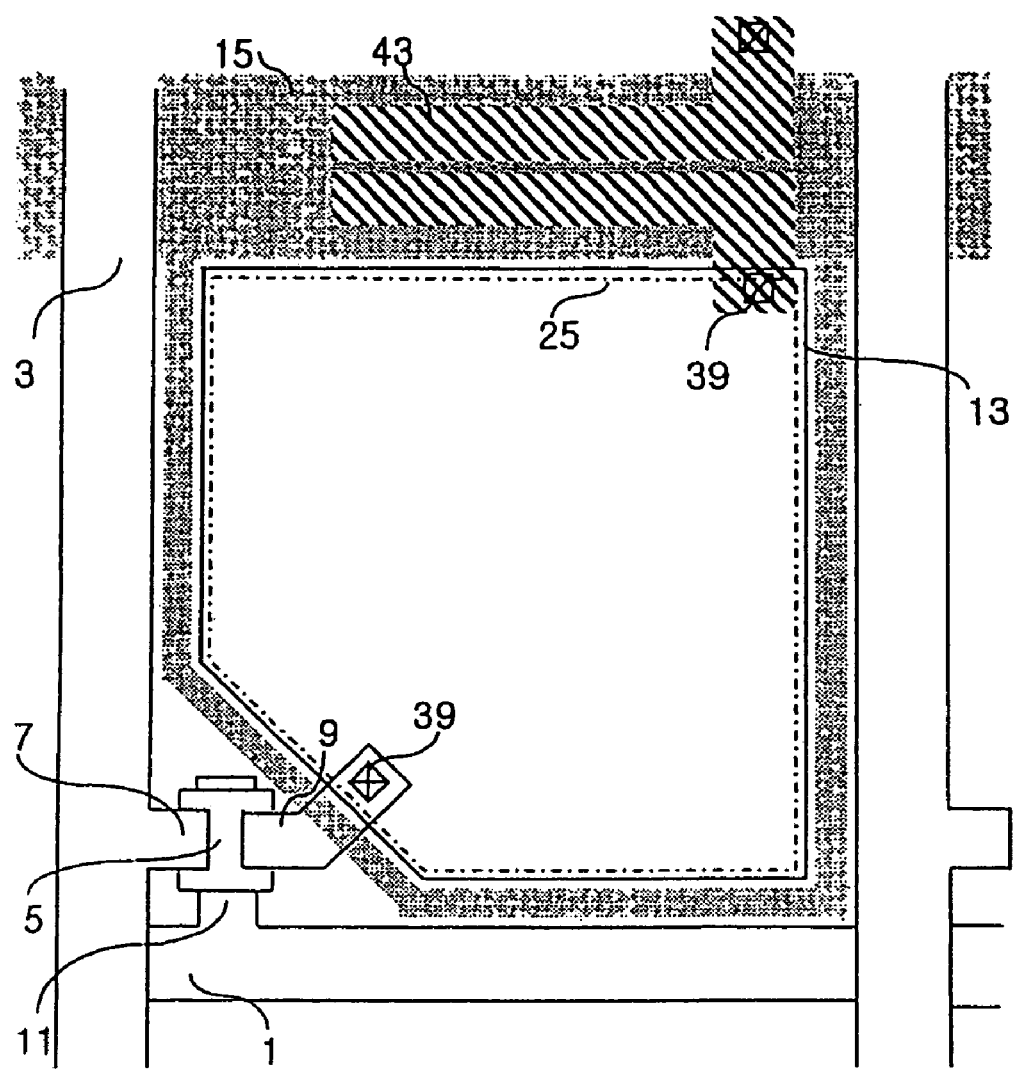
FIGS. 5A, 5B and 5C, 5D are plan and sectional views of the multi-domain liquid crystal display devices according to the fourth embodiment of the present invention.
Figure 5B:
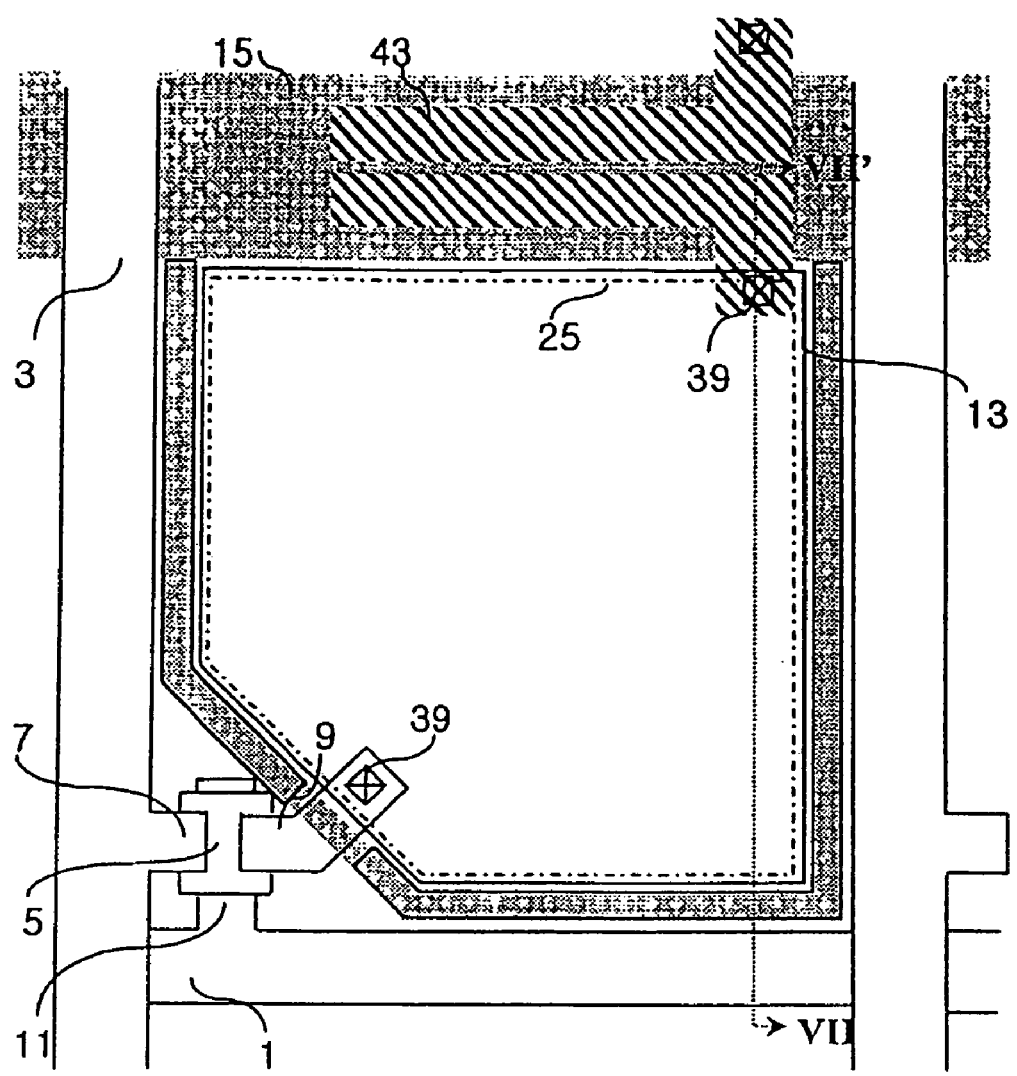
Figure 5C:
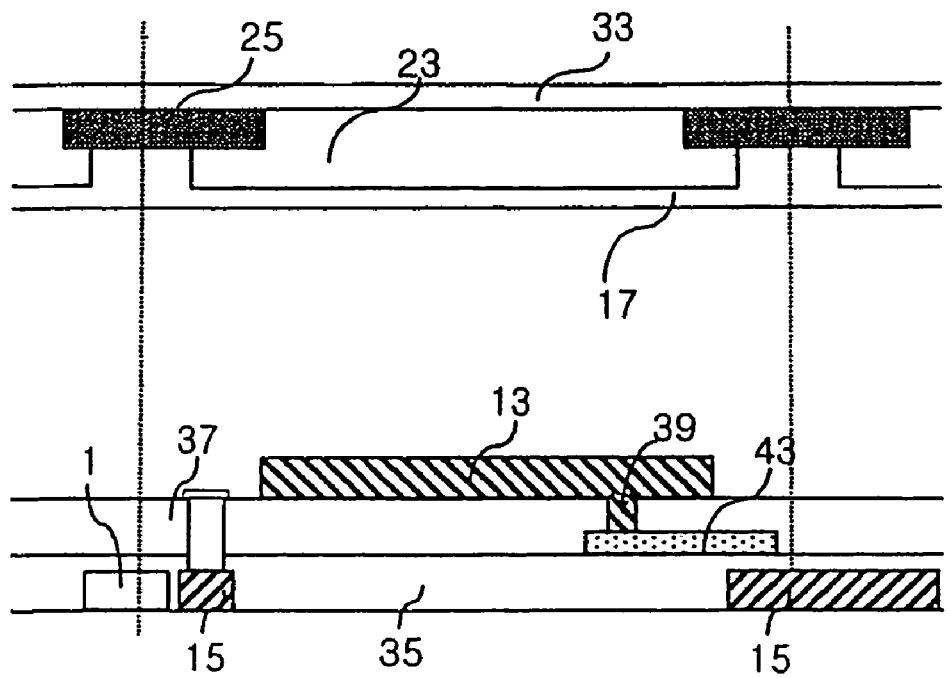
Figure 5D:
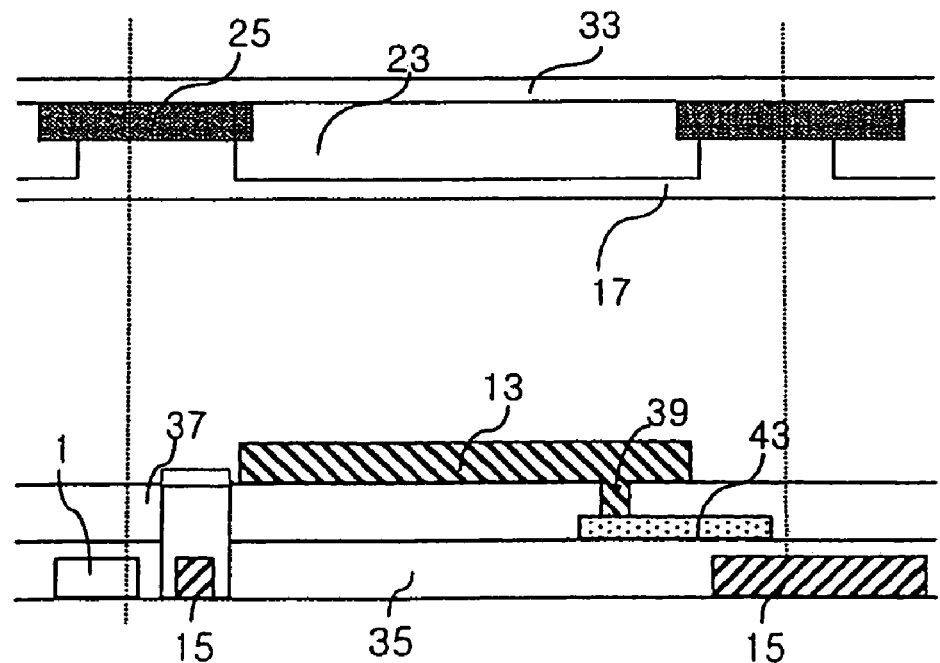

FIGS. 5A and 5B are plan views of the multi-domain liquid crystal display devices according to the fourth embodiment of the present invention, and FIGS. 5C and 5D are sectional views taken along the line VII–VII' in FIG. 5B.

The multi-domain LCD has the same structure as in the third embodiment of the present invention except as follows.

Pixel electrode 13 does not overlap common-auxiliary electrode 15, and the light shielding layer 25 overlaps the pixel electrode 13. At this time, a portion of the gate insulator 35 and passivation layer 37 on the common-auxiliary electrode 15 are removed, which intensifies the electric field of common-auxiliary electrode 15 that is applied to the pixel electrode 13 (refer to FIG. 5B).

FIG. 5C shows a portion of the gate insulator 35 and passivation layer 37 that are removed to expose a part of the common-auxiliary electrode 15, and the FIG. 5D shows that three sides of the common-auxiliary electrode 15 are exposed.

Figure 6A:
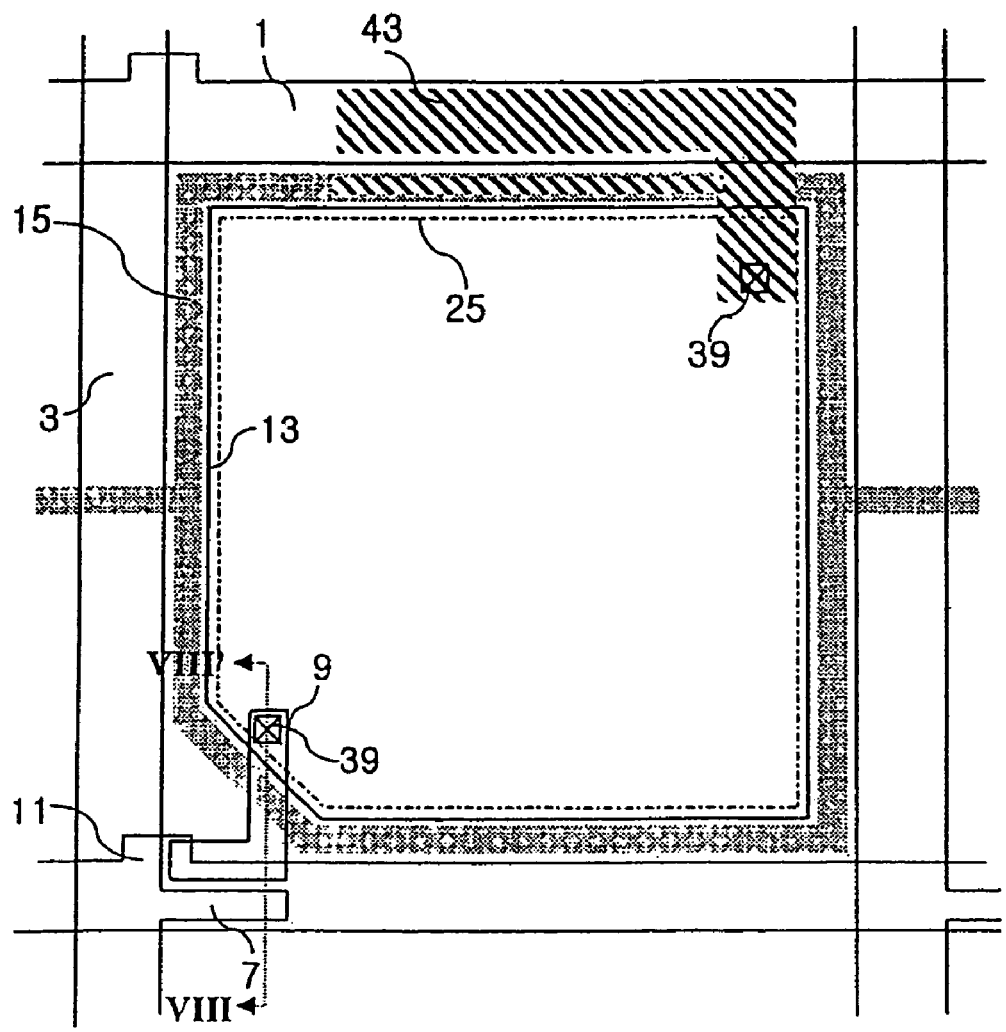
FIGS. 6A and 6B are plan and sectional views of the multi-domain liquid crystal display devices according to the fifth embodiment of the present invention.
Figure 6B:
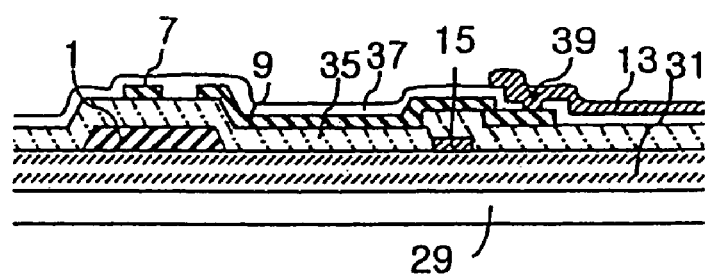

FIG. 6A is a plan view of the multi-domain liquid crystal display device according to the fifth embodiment of the present invention, and FIG. 6B is a sectional view taken along the line VIII–VIII' in FIG. 6A.

Figure 7:
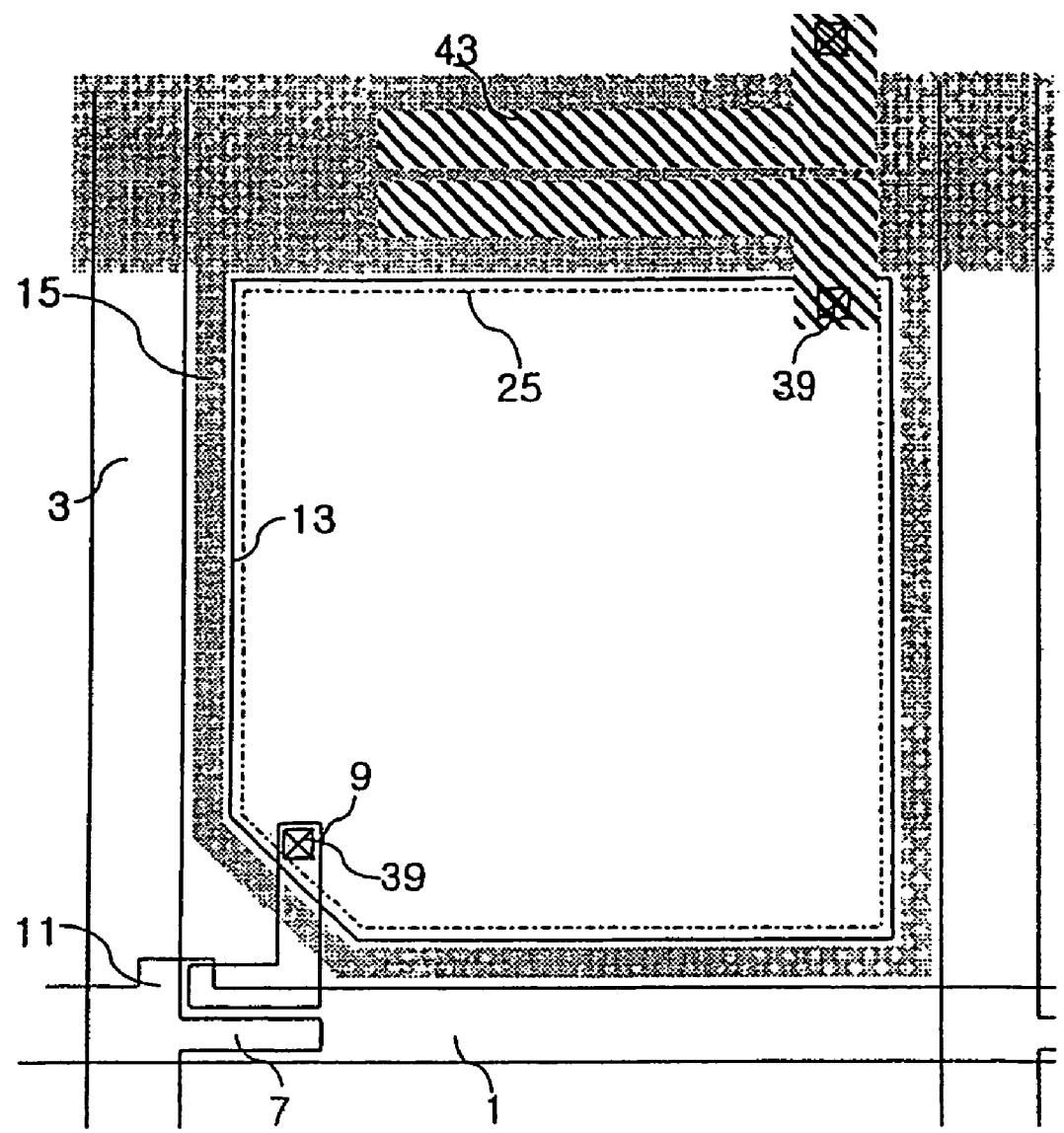
FIG. 7 is a plan view of the multi-domain liquid crystal display device according to the sixth embodiment of the present invention.
Figure 8A:
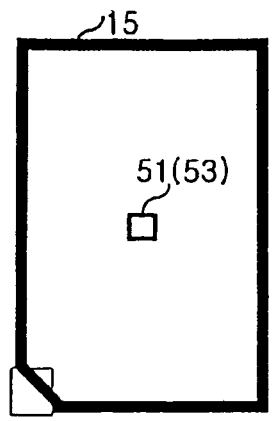
FIGS. 8A to 8G are plan views showing the various electric field inducing windows and dielectric frames according to the embodiments of the present invention.
Figure 8B:
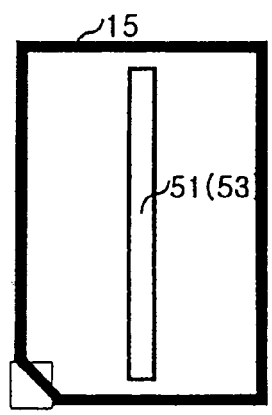
Figure 8C:
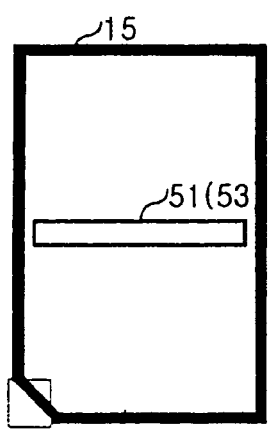
Figure 8D:
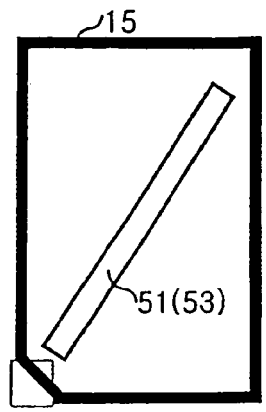
Figure 8E:
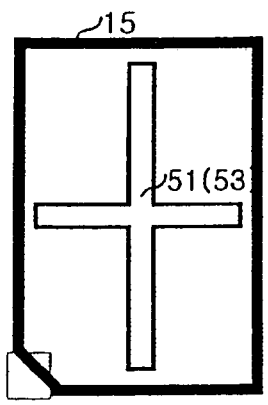
Figure 8F:
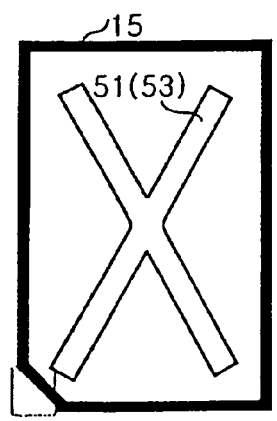
Figure 8G:
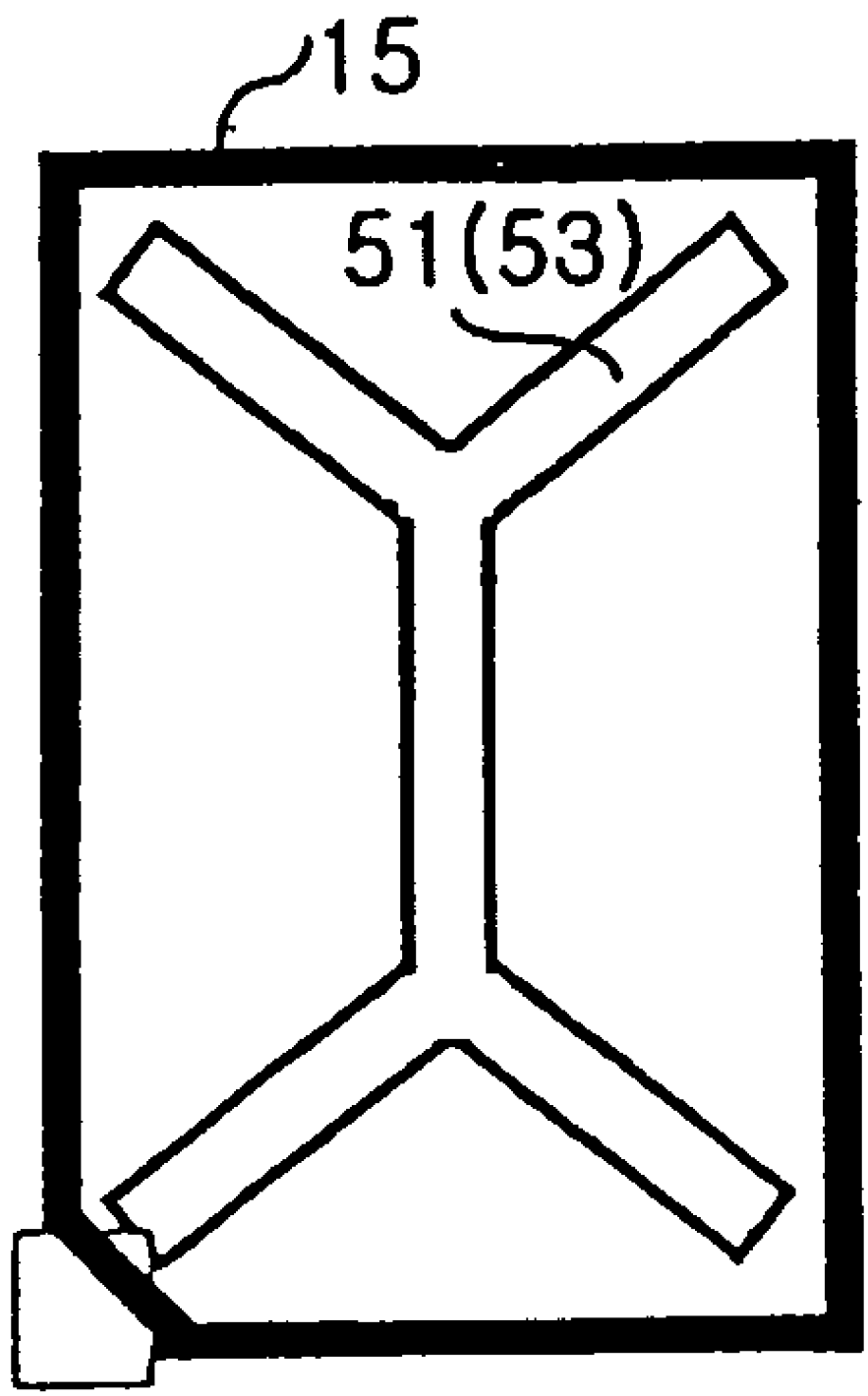

FIG. 7 is a plan view of the multi-domain liquid crystal display device according to the sixth embodiment of the present invention.

In the multi-domain LCD of the present invention, a part of upper-down pixels is formed on common-auxiliary electrode 15 that include a common storage electrode 43. The aperture ratio is largely improved as compared to the LCD in FIG. 6.

In the multi-domain LCD of the present invention, the aperture ratio is enhanced by an optimum structure design of a "n-line" thin film transistor (U.S. Pat. No. 5,694,185) so as to reduce power consumption, increase luminance, and lower reflection, thus improving contrast ratio. Aperture ratio is increased by forming the TFT above the gate line and providing a "n-line" TFT. The parasitic capacitor, occurring between the gate bus line and the drain electrode, can be reduced when a TFT having the same channel length as the symmetrical TFT structure is manufactured due to effect of channel length extension.

FIGS. 8A to 8G are plan views showing the various electric field inducing windows 51 and dielectric frames 53 according to the embodiments of the present invention.

The multi-domain LCD of the present invention has a dielectric frame 53 on the pixel electrode and/or common electrode, or an electric field inducing window 51 like a hole or slit in the pixel electrode, passivation layer, gate insulator, color filter layer, and/or common electrode by patterning, thereby electric field distortion effect and multi-domain are obtained.

That is, from forming electric field inducing window 51 or dielectric frame 53, the multi-domain is obtained by dividing each pixel into four domains such as in a "+", "x", or "double Y" shape, or dividing each pixel horizontally, vertically, and/or diagonally, and differently alignment-treating or forming alignment directions on each domain and on each substrate.

Furthermore, in multi-domain LCD of the present invention, an alignment layer (not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle. The light used in the photo-alignment is preferably a light in a range of ultraviolet light, and any of unpolarized light, linearly polarized light, and partially polarized light can be used.

In the rubbing or photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, since the multi-domain LCD of the present invention forms the pixel electrode and the common-auxiliary electrode on the same layer, a high voltage is not needed to raise the intensity of the electric field applied between the two electrodes. Also, in the case of conducting an alignment-treatment, a high response time and a stable LC structure can be obtained by a pretilt angle and an anchoring energy. Moreover, the disclination is thus removed to thereby improve the brightness.

It will be apparent to those skilled in the art that various modifications can be made in the liquid crystal display device of the present invention without departing from the spirit or scope of the invention. Thus, it is intended that the present invention covers the modifications and variations of this invention provided they come within the scope of the appended claims and their equivalents.

What is claimed is:

1. A multi-domain liquid crystal display device comprising:
    first and second substrates facing each other;
    a liquid crystal layer between said first and second substrates;
    a plurality of gate bus lines arranged in a first direction on said first substrate and a plurality of data bus lines arranged in a second direction on said first substrate to define a pixel region;
    a pixel electrode electrically charged through said data bus line in said pixel region;
    a common-auxiliary electrode surrounding said pixel electrode on a same layer whereon said gate bus line is formed;
    a gate insulator over said whole first substrate;
    a passivation layer on said gate insulator over said whole first substrate;
    a light shielding layer on said second substrate;
    a color filter layer on said light shielding layer;
    a common electrode on said color filter layer;
    an alignment layer on at least one substrate between said first and second substrates; and
    a dielectric frame for distorting electric field on said pixel electrode.

2. The multi-domain liquid crystal display device according to claim 1, wherein said passivation layer includes a material selected from the group consisting of BCB (BenzoCycloButene), acrylic resin, and polyimide compound.

3. The multi-domain liquid crystal display device according to claim 1, wherein said alignment layer is divided into at least two portions, liquid crystal molecules in said liquid crystal layer in each portion being aligned differently from each other.

4. The multi-domain liquid crystal display device according to claim 3, wherein at least one portion of said at least two portions of the alignment layer is alignment-treated.

5. The multi-domain liquid crystal display device according to claim 1, wherein said liquid crystal layer includes liquid crystal molecules having positive dielectric anisotropy.

6. A multi-domain liquid crystal display device comprising:
    first and second substrates facing each other;
    a liquid crystal layer between said first and second substrates;
    a plurality of gate bus lines arranged in a first direction on said first substrate and a plurality of data bus lines arranged in a second direction on said first substrate to define a pixel region;
    a pixel electrode electrically charged through said data bus line in said pixel region;
    a common-auxiliary electrode surrounding said pixel electrode on a same layer whereon said gate bus line is formed;
    a gate insulator over said whole first substrate;
    a passivation layer on said gate insulator over said whole first substrate;
    a light shielding layer on said second substrate;
    a color filter layer on said light shielding layer;
    a common electrode on said color filter layer;
    an alignment layer on at least one substrate between said first and second substrates; and
    a negative uniaxial film on at least one substrate.

* * * * *